United States Patent
Fujioka et al.

(10) Patent No.: US 7,601,210 B2
(45) Date of Patent: Oct. 13, 2009

(54) INK JET INK, METHOD OF PRODUCING INK JET INK, INK JET RECORDING METHOD, INK CARTRIDGE, AND CYAN INK

(75) Inventors: Fumiaki Fujioka, Kawasaki (JP); Shinichi Hakamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 11/911,767

(22) PCT Filed: Jun. 8, 2006

(86) PCT No.: PCT/JP2006/311966

§ 371 (c)(1),
(2), (4) Date: Oct. 17, 2007

(87) PCT Pub. No.: WO2006/132427

PCT Pub. Date: Dec. 14, 2006

(65) Prior Publication Data

US 2009/0053414 A1    Feb. 26, 2009

(30) Foreign Application Priority Data

Jun. 10, 2005   (JP)   ............................ 2005-171072

(51) Int. Cl.
C09D 11/02 (2006.01)
B41J 2/01 (2006.01)

(52) U.S. Cl. .................. 106/31.28; 106/31.78; 347/100

(58) Field of Classification Search ............... 106/31.28, 106/31.78; 347/100
See application file for complete search history.

(56) References Cited

U.S. PATENT DOCUMENTS

| 5,782,967 | A | 7/1998 | Shirota et al. | ............ 106/31.58 |
| 5,980,623 | A | 11/1999 | Hiraoka et al. | ........... 106/31.49 |
| 6,036,307 | A | 3/2000 | Hakamada et al. | .......... 347/106 |

(Continued)

FOREIGN PATENT DOCUMENTS

EP    1132441    9/2001

(Continued)

OTHER PUBLICATIONS

Machine translation of JP 08/218020, Aug. 1996.*

*Primary Examiner*—Helene Klemanski
(74) *Attorney, Agent, or Firm*—Fitzpatrick, Cella, Harper & Scinto

(57) ABSTRACT

An object of the present invention is to provide an ink jet ink capable of suppressing bronzing phenomenon in which a reflected light of an image looks red, is excellent in color developability, and gives an image with suppressed bleeding even when formed adjacent to an image formed with a black ink. The ink jet ink comprises water, coloring materials, and a water-soluble organic solvent, in which the coloring materials comprise at least one dye selected from the group consisting of C.I. Direct Blue 199, C.I. Direct Blue 86, and C.I. Acid Blue 9, and a pigment having a copper phthalocyanine skeleton; the water-soluble organic solvent comprises a poor medium for the pigment having the copper phthalocyanine skeleton; and a content of the pigment having the copper phthalocyanine skeleton in the ink is less than 1 mass % with respect to a total mass of the ink jet ink.

4 Claims, 2 Drawing Sheets

U.S. PATENT DOCUMENTS

| | | | |
|---|---|---|---|
| 6,214,963 B1 | 4/2001 | Noguchi et al. | 528/71 |
| 6,398,355 B1 | 6/2002 | Shirota et al. | 347/100 |
| 6,474,803 B1 | 11/2002 | Shirota et al. | 347/100 |
| 6,503,317 B1* | 1/2003 | Ortalano et al. | 106/31.28 |
| 6,514,328 B1 | 2/2003 | Katoh et al. | 106/31.28 |
| 6,552,156 B2 | 4/2003 | Noguchi et al. | 528/71 |
| 6,676,254 B2 | 1/2004 | Nagashima et al. | 347/100 |
| 6,698,875 B2* | 3/2004 | Onishi et al. | 347/100 |
| 6,698,876 B2 | 3/2004 | Sato et al. | 347/100 |
| 6,723,137 B1 | 4/2004 | Hakamada et al. | 8/549 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,141,105 B2 | 11/2006 | Udagawa et al. | 106/31.49 |
| 7,144,449 B2 | 12/2006 | Udagawa et al. | 106/31.15 |
| 7,185,978 B2 | 3/2007 | Nagashima et al. | 347/100 |
| 7,195,340 B2 | 3/2007 | Nagashima et al. | 347/56 |
| 7,208,032 B2 | 4/2007 | Hakamada et al. | 106/31.27 |
| 7,276,112 B2 | 10/2007 | Tokuda et al. | 106/31.6 |
| 7,282,090 B2* | 10/2007 | Osumi et al. | 106/31.78 |
| 7,291,214 B2 | 11/2007 | Tsuji et al. | 106/31.8 |
| 7,297,203 B2 | 11/2007 | Takada et al. | 106/31.8 |
| 7,303,618 B1* | 12/2007 | Taga et al. | 106/31.49 |
| 7,393,399 B2* | 7/2008 | Taga et al. | 106/31.78 |
| 7,425,233 B2* | 9/2008 | Hamajima et al. | 106/31.49 |
| 7,468,100 B2* | 12/2008 | Taga et al. | 106/31.78 |
| 2002/0005884 A1* | 1/2002 | Onishi et al. | 347/100 |
| 2003/0127018 A1* | 7/2003 | Shen et al. | 106/31.27 |
| 2005/0204955 A1 | 9/2005 | Nagashima et al. | 106/31.59 |
| 2005/0219341 A1 | 10/2005 | Nito et al. | 347/100 |
| 2006/0007288 A1 | 1/2006 | Takada et al. | 347/100 |
| 2006/0007289 A1 | 1/2006 | Nito et al. | 347/100 |
| 2006/0098067 A1 | 5/2006 | Imai et al. | 347/100 |
| 2006/0098068 A1 | 5/2006 | Hakamada et al. | 347/100 |
| 2006/0103704 A1 | 5/2006 | Hakamada et al. | 347/100 |
| 2006/0125895 A1 | 6/2006 | Nito et al. | 347/100 |
| 2007/0029522 A1 | 2/2007 | Udagawa et al. | 252/301.16 |
| 2007/0034114 A1 | 2/2007 | Udagawa et al. | 106/31.15 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |
| 2007/0134451 A1 | 6/2007 | Hakamada et al. | 428/32.38 |
| 2007/0188572 A1 | 8/2007 | Takayama et al. | 347/100 |
| 2007/0191508 A1 | 8/2007 | Nakagawa et al. | 523/160 |

FOREIGN PATENT DOCUMENTS

| | | |
|---|---|---|
| JP | 60-45668 | 10/1985 |
| JP | 8-218020 | 8/1996 |
| JP | 9-151344 | 6/1997 |
| JP | 10-298463 | 11/1998 |
| JP | 2000-290566 | 10/2000 |
| JP | 2001-293889 | 10/2001 |
| JP | 2001-323196 | 11/2001 |

* cited by examiner

INK JET INK, METHOD OF PRODUCING INK JET INK, INK JET RECORDING METHOD, INK CARTRIDGE, AND CYAN INK

TECHNICAL FIELD

The present invention relates to an ink jet ink, a method of producing the ink jet ink, an ink jet recording method, an ink cartridge, and a cyan ink.

BACKGROUND ART

An ink jet recording method is a recording method involving applying an ink droplet to any one of recording media such as plain paper and glossy media to form an image, and had become rapidly widespread owing to a reduction in its cost and an improvement in its recording rate. With the rapid spread of a digital camera in addition to an improvement in quality of an image recorded by the method, the method has been generally used as a method of outputting an image comparable to silver salt photography. Under the circumstances, in order to provide a recorded matter meeting the needs of the times, ideas have been proposed for not only, of course, the properties of ink for use in the ink jet recording method but also the properties of a coloring material.

As a coloring material for use in an ink jet cyan ink, there has been used a dye excellent in color developability, or a pigment excellent in water resistance, weather resistance, gas resistance, and the like. However, there have been cases where when forming an image with an ink using a dye as a coloring material, the water resistance and weather resistance of the image may be inferior to those of an image formed with an ink using a pigment. In order to solve such a problem, there has been proposed the combined use of a dye and a pigment as coloring materials (see, e.g., Japanese Patent Publication No. S60-45668 and Japanese Patent Application Laid-Open No. 2001-323196). It is reported therein that the combined use can improve the water resistance, weather resistance, and further gas resistance of an image formed on a recording medium having a porous ink receiving layer, while maintaining excellent color developability of a dye.

DISCLOSURE OF THE INVENTION

However, as a result of investigation of the present inventors, it has been found that, when an image is formed using a conventional ink which contains a dye and a pigment together as coloring materials, a specific combination of a dye and a pigment may pose a problem. In particular, when a conventional ink jet ink using both of a dye having a hue of cyan and a pigment having a copper phthalocyanine skeleton is given to a glossy recording medium, the following problems may arise. That is, there is a case where a phenomenon (bronzing phenomenon) may arise in which a light reflected from a formed image looks red, whereby the image quality may deteriorate remarkably. The present inventors have considered that a user who demands an image comparative to a silver halide photography is not satisfied by an obtained recorded matter because of occurrence of such a phenomenon. Then, the present inventors have recognized that it is important to provide an image in which the occurrence of the above-mentioned phenomenon can be suppressed as much as possible, and further, which is more excellent in color developability than a conventional ink jet ink.

It is, therefore, a first object of the present invention to provide a novel ink jet ink which suppresses the phenomenon in which a reflected light of an image looks red, and further, gives an image excellent in color developability not only on a glossy recording medium but also on plain paper. It is more preferable to provide a novel ink jet ink with which when, for example, an image is formed adjacent to an image formed with a black ink, a high quality image with suppressed bleeding can be obtained.

In addition, a second object of the present invention is to provide a novel method of producing an ink jet ink which suppresses the phenomenon in which a reflected light of an image looks red, and further, gives an image excellent in color developability, by an economical means which is preferable also from the viewpoint of environmental protection.

Furthermore, another object of the present invention to provide a novel ink jet recording method and an ink cartridge each using an ink jet ink which suppresses the phenomenon in which a reflected light of an image looks red, which is excellent also in color developability, and further, which gives an image with suppressed bleeding.

The present inventors have made extensive study and accomplished the present invention.

That is, according to a first aspect of the present invention, in order to attain the first object, there is provided an ink jet ink comprising water, coloring materials, and a water-soluble organic solvent, in which; the coloring materials comprise at least one dye selected from the group consisting of C.I. Direct Blue 199, C.I. Direct Blue 86, and C.I. Acid Blue 9, and a pigment having a copper phthalocyanine skeleton; the water-soluble organic solvent comprises a poor medium for the pigment having the copper phthalocyanine skeleton; and a content of the pigment having the copper phthalocyanine skeleton in the ink is less than 1 mass % with respect to a total mass of the ink jet ink.

Moreover, according to a second aspect of the present invention, in order to attain the first object, there is also provided a cyan ink for to be used in combination with a black ink comprising water, carbon black, and a water-soluble organic solvent, comprising as coloring materials at least one dye selected from the group consisting of C.I. Direct Blue 199, C.I. Direct Blue 86, and C.I. Acid Blue 9, and a pigment having a copper phthalocyanine skeleton; a water-soluble organic solvent comprising a poor medium for the pigment having the copper phthalocyanine skeleton, in which a content of the pigment having the copper phthalocyanine skeleton in the cyan ink is less than 1 mass % with respect to a total mass of the cyan ink.

Furthermore, according to a third aspect of the present invention, in order to attain the second object, there is provided a method of producing the above-mentioned ink jet ink, comprising the step of injecting an ink comprising at least one dye selected from the group consisting of C.I. Direct Blue 199, C.I. Direct Blue 86, and C.I. Acid Blue 9 as a coloring material into an ink cartridge storing ink which comprises a pigment having a copper phthalocyanine skeleton and a poor medium for the pigment.

In addition, according to another aspect of the present invention, in order to attain the third object, there is provided an ink jet recording method using the above-mentioned ink jet ink, the cyan ink, or ink jet ink produced by the above-mentioned method of producing an ink jet ink, and an ink cartridge storing any one of the above ink jet inks.

According to the present invention, there can be provided an ink jet ink and a cyan ink which suppress the phenomenon in which a light reflected from an image looks red, which is excellent also in color developability, and further, which can give an image with suppressed bleeding. There can be also provided a method of producing an ink jet ink which can produce the above-mentioned ink by a means which is economical and preferable also from the viewpoint of environmental protection by reusing an ink jet ink which remains in an ink cartridge or the like. Furthermore, there can be provided an ink jet recording method and an ink cartridge which suppress the phenomenon, especially in a glossy recording medium, in which a reflected light of an image looks red, are excellent also in color developability in both plain paper and glossy recording medium, and further can give an image with suppressed bleeding especially on plain paper.

BEST MODE FOR CARRYING OUT THE INVENTION

Figure 1:
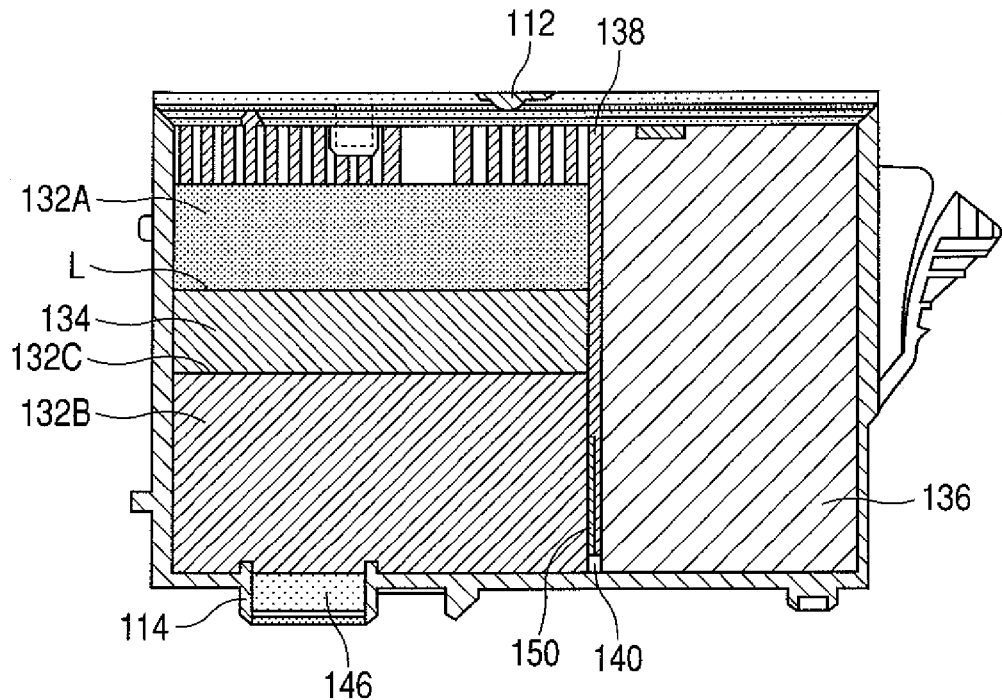
FIG. 1 is a schematic cross-sectional view showing an ink cartridge which is suitable to perform recording by using an ink according to the present invention.

The present invention will be described in detail by way of a preferred embodiment. Hereinafter, in the present invention, an ink jet ink may be referred to as an "ink", and a pigment having a copper phthalocyanine skeleton may be referred to as a "cyan pigment."

The ink of the present invention has a hue of cyan. The phenomenon that a reflected light of an image formed on a glossy recording medium with an ink containing, as coloring materials, both a dye which has a hue of cyan and a pigment having a copper phthalocyanine skeleton, such as C.I. Pigment Blue 15:3 looks red will be explained. This is because a light reflected by C.I. Pigment Blue 15:3 (cyan pigment) aggregating on a surface of a recording medium causes the bronzing (bronzing phenomenon) in which a color similar to a complementary color of an original color of the cyan pigment is observed. Then, the present inventors have studied pigments having copper phthalocyanine skeletons which are responsible for the bronzing phenomenon. As a result, they have found that it is possible to effectively suppress the bronzing phenomenon by using an ink in which a pigment having a copper phthalocyanine skeleton is contained in less than 1 mass % and a poor medium for the cyan pigment is also contained in a specific amount. Although the exact mechanism by which the ink with such a composition suppresses the bronzing phenomenon is not clear, the present inventors believe as follows.

As described above, since the bronzing phenomenon is a phenomenon resulting from a cyan pigment in an ink, it is predictable that the more effectively the occurrence of the bronzing phenomenon can be suppressed, the smaller the amount of the cyan pigment given to the glossy recording medium. Then, the present inventors have studied the relation between the content of the cyan pigment in the ink and the bronzing phenomenon. As a result, it has been found that it is possible to obtain a good result to some extent with regard to the suppression of occurrence of the bronzing phenomenon when the content of the cyan pigment in the ink is made less than 1 mass % in many cases although it somewhat depends on the type of the cyan pigment, the characteristics of the ink, and further, the recording method used. However, it has also been found that there are cases where it is not possible to suppress the occurrence of the bronzing phenomenon in a fully satisfactory level only by making the content of the cyan pigment in the ink less than 1 mass %.

Then, the present inventors have conducted further extensive studies while paying attention to the aggregation state of a cyan pigment given to a recording medium. Consequently, it has been found that it is possible to suppress the occurrence of the bronzing phenomenon by reducing the regular reflectance of a light reflected by an aggregation of a cyan pigment existing on a surface of the recording medium. That is, it has been found that the occurrence of the bronzing phenomenon can effectively be suppressed by making a cyan pigment given to a recording medium rapidly aggregate, thereby allowing a light incident on the aggregate of the cyan pigment to be irregularly reflected in moderation.

The present inventors have found that, even when the content of a cyan pigment in an ink is as small as less than 1 mass %, it is effective to make the cyan pigment rapidly aggregate on a surface of a recording medium. Furthermore, the present inventors have found that in order to obtain the above mentioned effect, it is necessary for the ink to contain a poor medium for the cyan pigment, for the following reason. That is, because the ink contains the poor medium, after deposition of the ink to a glossy recording medium, aggregation of the cyan pigment resulting from the evaporation and permeation of the water component of the ink takes place rapidly. Then, the unevenness of aggregates of the cyan pigment itself as well as the unevenness formed by the combination of the recording medium and the aggregates of the cyan pigment increases. Consequently, a light incident on the recording medium will be reflected irregularly in moderation, whereby the bronzing phenomenon effectively be suppressed.

Furthermore, it has also been found that, when the ink contains a poor medium for a cyan pigment, there is obtained, in addition to the effect of suppressing the bronzing phenomenon, the following further effect. That is, when giving the ink of the present invention to plain paper, it is possible to obtain excellent color developability and to suppress a phenomenon (hereinafter, referred to as "bleeding") that the quality of an image is degraded by blurring or uneven mixing of colors at a boundary of regions of different colors. The present inventors' presumption as to why the excellent color developability is obtained and the bleeding can be suppressed when using plain paper as a recording medium is described below with reference to FIGS. 3A, 3B and 3C.

Figure 3A:
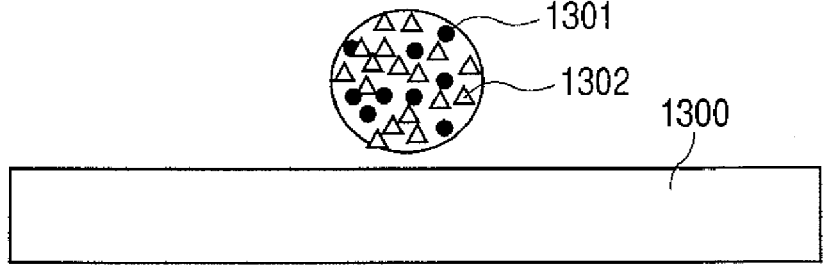
FIGS. 3A, 3B and 3C are schematic views illustrating a process commencing on the application of ink to a recording medium and ending on the fixation of the ink to the recording medium.
Figure 3B:
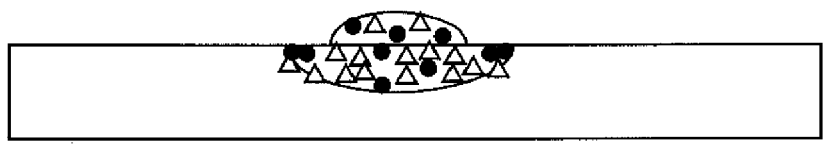
Figure 3C:
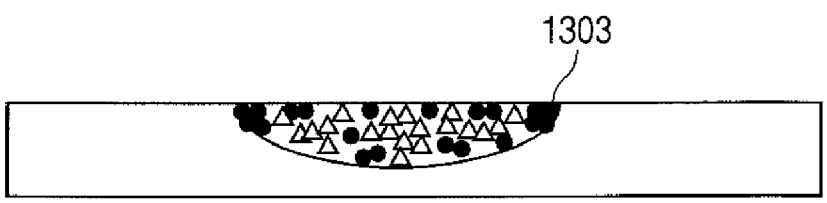

FIGS. 3A, 3B and 3C are schematic views illustrating a process from ink application to a recording medium to fixation thereto. In the figures, reference numeral 1300 denotes a recording medium; 1301 denotes a pigment having a phthalocyanine skeleton; 1302 denotes a dye; and 1303 denotes an aggregate of the pigment having a phthalocyanine skeleton.

When an ink of the present invention is applied to a recording medium 1300, a dye 1302 in the ink spreads along with fibers like a conventional ink after the ink adheres to the recording medium 1300. On the other hand, as for a cyan pigment 1301 in the ink, since the ratios of the cyan pigment 1301 and poor medium in the ink increases rapidly by evaporation of water immediately after the ink adheres to the recording medium 1300, aggregates 1303 will be generated (see FIGS. 3A and 3B).

Since the aggregates 1303 will be generated rapidly with the increase of the ratio of the poor medium in the ink, the aggregates 1303 are produced as if a bank of the cyan pigment were formed at not the central portion of a dot but the outer edge portion of the dot. Consequently, it is possible to suppress the dye from spreading in a lateral direction (see FIG. 3C).

The inventors consider that, with such mechanism, even when any other ink except the ink according to the present invention is applied to be adjacent to a dot (image) formed with the ink according to the present invention, bleeding can be suppressed well as compared to conventional ink containing both a dye and a cyan pigment as coloring materials.

At this time, the following constitution may be considered to be able to suppress bleeding with improved effectiveness. That is, carbon black is used as a coloring material of the black ink, and the ink according to the present invention described above is used as the cyan ink. At this time, a poor medium for carbon black is preferably incorporated into the black ink. Furthermore, a poor medium for the pigment having a copper phthalocyanine skeleton in the cyan ink to be used in combination with the black ink is preferably a poor medium for carbon black in the black ink because bleeding can be particularly effectively suppressed. The reason why such constitution as described above can particularly effectively suppress bleeding may be as described below. That is, when the coloring materials of the respective inks contact with each other on a recording medium or at a portion where the coloring materials permeate into the recording medium (depth direction), aggregates are rapidly formed. In the present invention, carbon black is particularly preferably self-dispersion carbon black in which at least one ionic group is bonded to the surface of a carbon black particle directly or via any other atomic group. In addition, a poor medium in each of the cyan ink and the black ink particularly preferably shows the maximum Ka value out of respective Ka values of water-soluble organic solvents in the inks.

Here, a Ka value determined by a Bristow method will be described. The value is used as an indication for the permeability of a liquid into a recording medium. Hereinafter, ink will be described as an example. Where the permeability of an ink is represented by the ink quantity V per 1 m², the penetration quantity V (mL/m²=µm) of the ink into the recording medium after a lapse of a stated time t after ink droplets have been ejected is represented by the following Bristow's equation (Eq. (1)).

$$V = V_r + Ka(t-t_w)^{1/2} \qquad \text{Eq.(1)}$$

Almost all the ink immediately after applied to a recording medium is absorbed in the recording medium at uneven portions of its surface (rough portions on the surface of the recording medium), and is hardly permeated into the recording medium (depth direction). A time for which this takes place is a contact time ($t_w$), and the quantity of the ink absorbed at the contact time in the recording medium at its uneven portions is $V_r$. When time lapses beyond the contact time after the ink is applied to the recording medium, the ink is permeated into the interior (depth direction) of the recording medium in a quantity proportional to the ½ power of a time lapsing beyond the contact time, i.e., $(t-t_w)^{1/2}$, so that the permeation quantity V increases. The Ka is a proportional coefficient of the portion of this increase, and takes a value corresponding to the rate of permeation. The Ka value can be measured by using, for example, a dynamic permeability tester for a liquid according to the Bristow method (for example, trade name: dynamic permeability tester S; manufactured by Toyo Seiki Seisaku-Sho, Ltd.).

The Ka value according to the Bristow method in the present invention is a value measured by using plain paper as a recording medium. Specific examples of the plain paper include: PB paper (manufactured by Canon Inc.) for use in a copying machine utilizing an electrophotographic method, a page printer (laser beam printer), or a printer utilizing an ink jet recording method; and PPC paper for use in a copying machine utilizing an electrophotographic method. The assumed measurement environment is an environment such as an ordinary office (for example, an environment having a temperature of 20° C. to 25° C. and a humidity of 40% to 60%).

The suppression of the bleeding which is one of the effects of the present invention can be achieved by the ink of the present invention which contains a poor medium for a pigment having a copper phthalocyanine skeleton. However, in order to obtain the effect of the present invention more efficiently, it is preferable to adopt the following constitution. That is, it is preferable that a content A in terms of mass % of the pigment having the copper phthalocyanine skeleton and a content B in terms of mass % of the poor medium in the ink have a ratio of B to A (B/A) of 1 or more and 4 or less. Incidentally, the above-mentioned A and B each refer to a content (mass %) with respect to the total mass of the ink. By adjusting the rate of B to A (i.e., B/A) to 1 or more, it is possible to form larger aggregates of a cyan pigment in the vicinity of a surface of a recording medium. Hence, it becomes possible to suppress the bronzing phenomenon in the case of forming an image on a glossy recording medium, and further to suppress the bleeding in the case of forming an image in plain paper easily. Moreover, by adjusting the ratio (B/A) of B to A to 4 or less, also in the case of storing the ink for a long period of time, it is possible to make the ink excellent in storage stability. Specifically, it is possible to obtain effects such as a small rate of change of the mean particle diameter of the cyan pigment in ink, no substantial increase of viscosity of the ink, no generation of gel-like sediment in the ink, or the like.

In addition, the following constitution is preferable for obtaining excellent color developability when the ink according to the present invention is applied to a recording medium. A ratio C:B between the content B (mass %) of the poor medium in the ink according to the present invention and the content C (mass %) of a good medium in the ink is preferably 10:5 or more and 10:30 or less. In other words, when the content C is 10, the content B is preferably 5 or more and 30 or less (that is, a ratio C/B is preferably 0.3 or more and 2 or less). Incidentally, the above-mentioned B and C each refer to a content (mass %) with respect to the total mass of the ink. Setting a ratio between the contents of the poor medium and the good medium in the ink within the above-described range can result in the easier formation of the aggregate of the cyan pigment near the surface of the recording medium. As a result, excellent color developability can be obtained. The definition of each of the poor medium and the good medium in the present invention, and a method of selecting each of the solvents will be described later.

Furthermore, in order to obtain the excellent color developability as described above, it is preferable that the surface tension of the ink of the present invention is 34.0 mN/m or more in 25° C., with 38.0 mN/m or more being more preferred. When the surface tension of the ink is less than 34.0 mN/m, the permeation rate of the ink into the recording medium becomes large rather than the aggregation rate of the cyan pigment. For this reason, there are cases where although the bleeding can be suppressed, the excellent color developability cannot be satisfactorily obtained. Moreover, it is preferable that the surface tension of the ink of the present invention is 41.0 mN/m or less. When the surface tension of ink is more than 41.0 mN/m, there may be a case where the fixability of the ink to a recording medium is not fully obtained, or a case where the bleeding cannot be fully suppressed. Incidentally, in the following description, the surface tension was measured at a temperature of 25° C. using a Kyowa CBVP-2 type surface tension meter (manufactured by Kyowa Kagaku Co., Ltd.).

<Content of Coloring Material>

It is preferable that the content A in terms of mass % of a cyan pigment and the content D in terms of mass % of a dye in the ink of the present invention satisfy such relationship that the value of A/D×100% is 7% or more and less than 25%. Incidentally, the above-mentioned A and D each refer to a content (mass %) with respect to the total mass of the ink. The reason is that by adjusting the above-mentioned percentage value to be 7% or more, aggregates of an amount sufficient to suppress the spreading of the dye in a lateral direction on a recording medium are formed, whereby the bleeding can be suppressed more effectively. Moreover, by adjusting the above-mentioned percentage value to be less than 25%, a difference in glossiness (hereafter, referred to as "uneven glossiness") between a part to which the dye is given and a part to which the cyan pigment is given on a glossy recording medium can be made hardly recognizable by visual observation.

It is preferable that the lower limit of the content (mass %) of the cyan pigment in the ink of the present invention is 0.2 mass % or more, or further, 0.7 mass % or more with respect to the total mass of the ink. If the content of the cyan pigment is less than 0.2 mass %, it is impossible to perform the suppression of the bronzing phenomenon on a glossy recording medium which is one of the effects of the present invention. At that time, there is a case where there cannot be satisfactorily obtained another effect of the present invention when using plain paper as a recording medium such that the excellent color developability can be obtained, or the bleeding can be suppressed. This is because there is a case where when the content of a cyan pigment is less than 0.2 mass %, a phenomenon that a dye in the ink spreads after giving the ink to plain paper cannot be suppressed. Incidentally, as described above, it is necessary to make the upper limit of the content (mass %) of a cyan pigment less than 1 mass % with respect to the total mass of the ink. In addition, it is preferable to make the lower limit of the content (mass %) of a dye in the ink of the present invention 2.0 mass % or more, or further, 3.0 mass % or more with respect to the total mass of the ink. This is because the excellent color developability may not be obtained when the content of the dye is less than 2.0 mass %. In addition, it is preferable to make the upper limit of the content (mass %) of a dye in the ink of the present invention 5.0 mass % or less, or further, 3.7 mass % or less with respect to the total mass of the ink. The reliability of the ink may not be obtained when the content of the dye is more than 5.0 mass %.

<Definition of Each of Poor Medium and Good Medium>

The ink of the present invention contains a pigment having a copper phthalocyanine skeleton in a state where the pigment is dispersed into an aqueous medium. The followings can be used as the above-mentioned pigment having a copper phthalocyanine skeleton. For example, a self-dispersion pigment in which at least one ionizable group is bonded to the surface of a pigment particle directly or via another atomic group, a resin-dispersion pigment dispersed into an aqueous medium by means of a dispersant, a surfactant, or the like can be mentioned.

In the present invention, a water-soluble organic solvent that can stably maintain the dispersed state of a dispersion component of a pigment having a copper phthalocyanine skeleton present in the ink in such state as described above is defined as a good medium, and a water-soluble organic solvent that cannot stably maintain a dispersed state is defined as a poor medium.

To be more specific, determination as to whether a water-soluble organic solvent to be used is a poor medium or good medium for the dispersing component of a pigment having a copper phthalocyanine skeleton is performed as described below. First, two kinds of dispersion solutions, that is, a dispersion solution X of the dispersing component of a pigment having a copper phthalocyanine skeleton containing the water-soluble organic solvent to be determined and a water dispersion solution Y of the pigment dispersion shown below are prepared.

Dispersion liquid X: A dispersion solution containing 50 mass % of the water-soluble organic solvent to be determined, 5 mass % of a pigment having a copper phthalocyanine skeleton, or 5 mass % in total of a pigment having a copper phthalocyanine skeleton and a substance contributing to the dispersion of a pigment having a copper phthalocyanine skeleton, and 45 mass % of water.

Water dispersion solution Y: A water dispersion solution containing 5 mass % of a pigment having a copper phthalocyanine skeleton, or 5 mass % in total of a pigment having a copper phthalocyanine skeleton and a substance contributing to the dispersion of a pigment having a copper phthalocyanine skeleton, and 95 mass % of water.

Next, the average particle size of the pigment having a copper phthalocyanine skeleton after the dispersion solution X has been stored at 60° C. for 48 hours is measured. In addition, the average particle size of the pigment having a copper phthalocyanine skeleton in the water dispersion solution Y is measured in the same manner. The average particle size of the pigment having copper phthalocyanine skeletons in the dispersion solution X and the average particle size of the pigment having copper phthalocyanine skeletons in the water dispersion solution Y are defined as a particle size (A) and a particle size (B), respectively. At this time, when the particle size (A) is larger than the particle size (B), the water-soluble organic solvent is determined to be a poor medium. When the particle size (A) is equal to or smaller than the particle size (B), the water-soluble organic solvent is determined to be a good medium.

A method for determination as to whether the water-soluble organic solvent to be used is a poor medium or good medium for the dispersing component of a pigment having a copper phthalocyanine skeleton has been described above; provided that determination as to whether the water-soluble organic solvent to be used is a poor medium or good medium can be performed in the same manner as that described above even when carbon black is used as a pigment.

Specific examples of the water-soluble organic solvent as a poor medium for the pigment having the copper phthalocyanine skeleton used in the present invention include polyethylene glycol 1000 (polyethylene glycol having an average molecular weight of 1,000), 2-pyrrolidone, and 1,5-pentanediol, or the like. In addition, specific examples of a water-soluble organic solvent as a good medium for the pigment having the copper phthalocyanine skeleton include glycerin and ethylene glycol, or the like. Of course, the poor and good mediums that can be used in the present invention are not limited to those described above.

<Ink Jet Ink>

Next, each component constituting the ink according to the present invention will be described.

[Coloring Material]

The ink according to the present invention must contain a pigment having a copper phthalocyanine skeleton as a coloring material. The bronzing phenomenon of an image formed using an ink containing a pigment having a copper phthalocyanine skeleton as a coloring material very significantly develops in comparison with a case where an ink containing another kind of a coloring material is used. For this reason, one of the objects of the present invention is to solve the problem of the above-mentioned bronzing phenomenon.

As the pigment having a copper phthalocyanine skeleton that can be used for the ink of the present invention, the followings are mentioned. Specifically, for example, C.I. Pigment Blue 15:3, C.I. Pigment Blue 15:4, and C.I Pigment Blue 16, etc. are mentioned. Of the above-mentioned pigments having copper phthalocyanine skeletons, in the present invention, it is especially preferable to use C.I. Pigment Blue 15:3.

Furthermore, the ink according to the present invention must contain a specific dye in addition to pigment having a copper phthalocyanine skeleton described above. The term "specific dye" refers to one or more kinds of dyes selected from the group consisting of C.I. Direct Blue 199, C.I. Direct Blue 86, and C.I. Acid Blue 9. The reason why the effects of the present invention are obtained by using such a dye is not clearly understood. However, the present inventors presume it to be as follows. The above-mentioned dyes have characteristics, such as excellence in color developability. Accordingly, it is believed that, even when the content of a cyan pigment is small as is the case with the present invention, in addition to the capability of forming an image with high color developability, some synergistic effects are exhibited by the combined use with a poor medium for a pigment having a copper phthalocyanine skeleton.

(Pigment Having Copper Phthalocyanine Skeleton)

A pigment having a copper phthalocyanine skeleton in the ink according to the present invention can be used irrespective of its dispersion method. For example, a resin dispersion type pigment (resin-dispersion pigment) to be dispersed by using a dispersant or a surfactant dispersion type pigment to be dispersed by using a surfactant can be used. A self dispersion type pigment (self-dispersion pigment) which is adapted to be capable of dispersion without the use of a dispersant or the like by introducing an ionizable group to the surface of each of its particles can also be used. Furthermore, there can be used a microcapsule type pigment whose dispersibility is improved by, for example, coating the surface of each of its particles with organic polymers or a polymer-bonded type self-dispersion pigment modified by chemically bonding an organic group containing a polymer to the surface of each of its particles. Of course, in the present invention, the above-exemplified pigments different from each other in a dispersion method can be used in combination. Hereinafter, a pigment that can be used in the present invention will be described.

[Resin Dispersion Pigment]

As described above, a resin dispersion pigment can be used as the pigment having a copper phthalocyanine skeleton in the ink according to the present invention. In this case, a hydrophobic pigment is preferably dispersed into an aqueous medium by using a dispersant, a surfactant, or the like. The dispersant or surfactant to be used at this time is not particularly limited, and any one of the following dispersants and surfactants can be used.

An anionic surfactant or a nonionic surfactant may be used as a surfactant. The following may be used as the anionic surfactant. Specifically, for example, a fatty acid salt, an alkyl sulfate, an alkyl benzenesulfonate, an alkyl naphthalenesulfonate, a dialkyl sulfosuccinate, an alkyl phosphate, a formalin condensate of naphthalenesulfonic acid, a polyoxyethylene alkyl sulfate, and substituted derivatives thereof.

The following may be used as the nonionic surfactant. Specifically, for example, a polyoxyethylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene alkylamine, a glycerin fatty acid ester, an oxyethylene oxypropylene block polymer, and substituted derivatives thereof.

The following may be used as the dispersant. Specifically, for example, block copolymers, random copolymers, and graft copolymers each composed of at least two monomers (at least one of which is a hydrophilic monomer) selected from: styrene and a derivative thereof; vinyl naphthalene and a derivative thereof; a fatty acid alcohol ester of $\alpha,\beta$-ethylenically unsaturated carboxylic acid; acrylic acid and a derivative thereof; maleic acid and a derivative thereof; itaconic acid and a derivative thereof; fumaric acid and a derivative thereof; and vinyl acetate, vinyl alcohol, vinyl pyrrolidone, and acrylamide, and derivatives thereof, and salts of the copolymers. Furthermore, for example, a block copolymer and a random copolymer may be used in combination.

[Microcapsule Type Pigment]

As described above, a microcapsule-type pigment with improved dispersibility, which is obtained by coating the surface of the particles with the organic polymers to prepare a microcapsule, can be used as the pigment having a copper phthalocyanine skeleton in the ink according to the present invention.

[Self-dispersion Pigment]

As described above, a self-dispersion pigment which is adapted to enable the dispersion of the pigment without the use of a dispersant or the like by introducing a ionizable group to the surface of the particles can be used as the pigment having a copper phthalocyanine skeleton in the ink according to the present invention. The self-dispersion pigment preferably has a ionizable group chemically bonded to the surface of a pigment particle either directly or via another atomic group. For example, a ionizable group is preferably selected from the group consisting of —COOM, —SO$_3$M, and —PO$_3$H(M)$_2$ (M in the formulae represents a hydrogen atom, an alkali metal, ammonium, or an organic ammonium) introduced to the surface of a pigment particle. The other atomic group is preferably an alkylene group having 1 to 12 carbon atoms, a substituted or unsubstituted phenylene group, or a substituted or unsubstituted naphthylene group. A self-dispersion pigment with its surface oxidized can also be suitably used, which is obtained by means of, for example, a method involving oxidizing a pigment with soda hypochlorite, a method involving oxidizing the pigment through a submerged ozone treatment, or a method involving performing an ozone treatment and subjecting the pigment to wet oxidation to modify the surface of the pigment.

[Polymer-bonded Self-dispersion Pigment]

As described above, a polymer-bonded type self-dispersion pigment with modified by chemically bonding an organic group containing a polymer to the surface of the particles can be used as the pigment having a copper phthalocyanine skeleton in the ink according to the present invention. The polymer-bonded type self-dispersion pigment preferably contains a reactant of: a functional group chemically bonded to the surface of the pigment particle either directly or via another atomic group; and a copolymer of an ionic monomer and a hydrophobic monomer. This is because a copolymerization ratio between the ionic monomer and the hydrophobic monomer as materials for forming a copolymer to be used for modifying the surface of the pigment particle can be appropriately changed, and the change allows the hydrophilicity of the modified pigment to be appropriately adjusted. Various properties can also be imparted to the surface of the pigment particle because the kinds of ionic and hydrophobic monomers and the combination of the monomers can be appropriately changed.

[Aqueous Medium]

As described above, the ink according to the present invention is characterized in that it contains a pigment having a copper phthalocyanine skeleton in a specific amount, a specific dye, and a poor medium for the pigment. Any one of the components to be used in conventional ink jet ink can be used as any other ink component except those described above. For example, any one of the following aqueous media can be used for dissolving or dispersing the above-described pigment and dye in the ink as long as the medium contains a poor medium for the pigment.

As the aqueous medium, it is preferable to use an aqueous medium containing water, or water and a water-soluble organic solvent. The content (mass %) of the water-soluble organic solvent in the ink according to the present invention is preferably 3.0 mass % or more and 50.0 mass % or less with respect to the total mass of the ink. To be specific, for example, any one of the following solvents can be used as the water-soluble organic solvent.

Alkanol having 1 to 4 carbon atoms such as ethanol, isopropanol, n-butanol, isobunanol, secondary butanol, and tertiary butanol; carboxylic amide such as N,N-dimethylformamide or N,N-dimethylacetamide; ketone or ketoalcohol such as acetone, methylethylketone, and 2-methyl-2-hydroxypentane-4-one; cyclic ether such as tetrahydrofuran and dioxane; polyalcohols such as glycerin, ethylene glycol, diethylene glycol, triethylene glycol, tetraethylene glycol, 1,2- or 1,3-propylene glycol, 1,2- or 1,4-butylene glycol, polyethylene glycol, 1,3-butanediol, 1,5-pentanediol, 1,2-hexanediol, 1,6-hexanediol, dithioglycol, 2-methyl-1,3-propanediol, 1,2,6-hexanetriol, an acetylene glycol derivative, and trimethylol propane; alkyl ethers of the polyalcohols such as ethylene glycol monomethyl (or ethyl)ether, diethylene glycol monomethyl (or ethyl)ether, and triethylene glycol monoethyl (or butyl)ether; heterocycles such as 2-pyrrolidone, N-methyl-2-pyrrolidone, 1,3-dimethyl-2-imidazolidinone, and N-methyl morpholine; a sulfur-containing compound such as dimethyl sulfoxide, and urea and an urea derivative.

In addition, deionized water (ion-exchanged water) is preferably used as water. The content (mass %) of water in the ink according to the present invention is preferably 50.0 mass % or more and 90.0 mass % or less with respect to the total mass of the ink in order that the ink may have such an appropriate viscosity that the ink can be stably ejected and clogging at the tip of a nozzle may be suppressed.

[Additives]

In the ink of the present invention, in addition to the above component, various additives such as a surfactant, a pH adjustor, a chelating agent, a rust inhibitor, a antiseptic, a mildew-proofing agent, a UV absorber, a viscosity modifier, a defoaming agent, and a water-soluble polymer may be incorporated.

Examples of a surfactant include, for example, an anionic surfactant, an amphoteric surfactant, a cationic surfactant, and a nonionic surfactant. Specific examples of the anionic surfactant include as follows.

Specific examples of the anionic surfactant include as follows. Alkylsulfo carboxylate, α-olefin sulfonate, polyoxyethylene alkylether acetate, N-acylamino acid or salts thereof, N-acylmethyl taurine salt, alkyl sulfate polyoxy alkylether sulfate, alkyl sulfate polyoxyethylene alkylether phosphate, a rosin acid soap, a castor oil sulfate ester, a lauryl alcohol sulfate ester, an alkylphenol-type phosphate ester, an alkyl-type phosphate ester, alkylallyl sulfonate, diethyl sulfosuccinate, and diethylhexyl sulfosuccinate dioctyl sulfosuccinate.

Specific examples of the cationic surfactant include a 2-vinyl pyridine derivative and a poly(4-vinyl)pyridine derivative. Specific examples of the amphoteric surfactant include lauryl dimethylamino betaine acetate, 2-alkyl-N-carboxymethyl-N-hydroxyethyl imidazolinium betaine, coconut oil fatty acid amide propyldimethylamino betaine acetate, polyoctyl polyaminoethyl glycine, and an imidazoline derivative.

Specific examples of the nonionic surfactant include as follows. Ethers such as polyoxyethylene nonylphenyl ether, polyoxyethylene octylphenyl ether, polyoxyethylene dodecylphenyl ether, polyoxyethylene lauryl ether, polyoxyethylene oleyl ether, polyoxyethylene alkyl ether, and polyoxyalkyl alkyl ether; esters such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; acetylene glycols such as 2,4,7,9-tetramethyl-5-decine-4,7-diol, 3,6-dimethyl-4-octyn-3,6-diol, and 3,5-dimethyl-1-hexyn-3-ol (for example, Acetylenol EH manufactured by Kawaken Fine Chemicals Co., Ltd., and Surfynol 104, 82, 465 and Olfine STG, manufactured by NISSIN CHEMICAL INDUSTRY CO., LTD).

<Method of Producing Ink Jet Ink>

The ink according to the present invention has only to satisfy the following constitution requirements essential to the present invention. That is, coloring materials must contain a specific dye and a pigment having a copper phthalocyanine skeleton. The term "specific dye" refers to at least one dye selected from the group consisting of C.I. Direct Blue 199, C.I. Direct Blue 86, and C.I. Acid Blue 9. In addition, the ink must contain a poor medium for the above-mentioned cyan pigment as a water-soluble organic solvent, and must have the content of the cyan pigment in the ink to be less than one mass %. The ink according to the present invention has only to satisfy the above constitution requirements, and a method of producing the ink and an embodiment of the ink are not particularly limited.

The following embodiment is applicable to the present invention. For example, an ink jet ink produced in accordance with an ordinary method by using the above-described respective components can be exemplified. In another embodiment, the ink according to the present invention can be produced also by the below-mentioned means which is economical and preferable also from the viewpoint of environmental protection by reusing ink which remains in an ink cartridge.

An example of such embodiment is a method of producing ink including the step of injecting ink containing a specific dye into an ink cartridge storing ink containing a pigment having a copper phthalocyanine skeleton and a poor medium for the pigment. The term "specific dye" refers to at least one dye selected from the group consisting of C.I. Direct Blue 199, C.I. Direct Blue 86, and C.I. Acid Blue 9.

As described above, it is possible to fully obtain the effects of the present invention even when the contents of the pigment having a copper phthalocyanine skeleton and the poor medium for the pigment in the ink of the present invention are small. For this reason, it is possible to produce the ink of the present invention also by the embodiment which is described above. By producing the ink by the above-mentioned method, it becomes possible to reuse an ink cartridge containing a pigment having a copper phthalocyanine skeleton having excellent performance and a poor medium for the pigment, thereby reducing the production cost. Furthermore, according to the above-mentioned method, it is possible to further obtain the effect that filling of an ink into an ink cartridge which has contained an ink once, or an ink cartridge which has an ink containing portion which contains the ink becomes easy.

<Black Ink>

The ink according to the present invention is particularly preferably a cyan ink to be used in combination with a black ink containing water, carbon black, and a water-soluble organic solvent. It is believed that by adopting such a constitution, the bleeding can be more effectively suppressed. Hereafter, respective components which compose such a black ink will be explained.

[Coloring Materials]

Carbon black in the black ink can be used irrespective of its dispersion method. As is the case with the above-mentioned dispersing method of a pigment having a phthalocyanine skeleton, it is possible to use, for example, a resin dispersion type carbon black (resin-dispersion carbon black) which is dispersed using a dispersant or a surfactant dispersion type carbon black which is dispersed using a surfactant. Moreover, it is possible to use a self-dispersing type carbon black (self-dispersion carbon black) which is made dispersible without using a dispersant or the like by introducing an ionizable group to the surface of carbon black particles. Moreover, it is possible to use a microcapsule type carbon black whose dispersibility is increased by covering the surface of carbon black particles with an organic polymer, or the like. Furthermore, it is possible to use a polymer-bonded type self-dispersion carbon black which is reformed (or modified) by chemically bonding an organic group including a polymer to the surface of carbon black particles. Of course, in the present invention, it is also possible to use, in combination, the above-mentioned carbon blacks whose dispersing methods are different.

As the carbon black which can be used for a black ink used in combination with the ink of the present invention, it is possible to use carbon black such as furnace black, lamp black, acetylene black, and channel black. Specifically, it is possible to use the following products which are commercially available.

Raven: 1170, 1190ULTRA-II, 1200, 1250, 1255, 1500, 2000, 3500, 5000ULTRA, 5250, 5750 and 7000 (all available from Colombia Carbon Co.);

Black Pearls L; Regal: 330R, 400R and 660R; Mogul L; Monarch: 700, 800, 880, 900, 1000, 1100, 1300, 1400, and 2000; and Valcan XC-72R (all available from Cabot Co.);

Color Black FW1, FW2, FW2V, FW18, FW200, S150, S160 and S170; Printex: 35, U, V, 140U and 140V; Special Black: 4, 4A, 5 and 6 (all available from Degussa Corp.);

No. 25, No. 33, No. 40, No. 47, No. 52, No. 900, No. 2300; MCF-88, MA600, MA7, MA8 and MA100 (all available from Mitsubishi Chemical Corporation).

Moreover, it is also possible to use carbon black newly prepared for the present invention. However, the present invention is not limited to these but it is possible to use any one of hitherto known carbon blacks. Moreover, it is also possible to use magnetic fine particles such as magnetite and ferrite, titanium black with a carbon black.

The content (mass %) of the carbon black in the black ink is preferably 0.1 mass % or more and 15.0 mass % or less, or more preferably 1.0 mass % or more and 10.0 mass % or less with respect to the total mass of the black ink.

[Aqueous Medium]

As the aqueous medium used for the black ink, it is preferable to use an aqueous medium containing water, or water and a water-soluble organic solvent. In addition, a poor medium for the above-mentioned carbon black is preferably incorporated into the black ink. It should be noted that the term "carbon black" includes dispersing components such as resin-dispersion carbon black and self-dispersion carbon black. The reason is that by adopting such constitution, it becomes possible to more effectively suppress the bleeding. Furthermore, a poor medium for the pigment having a copper phthalocyanine skeleton in the cyan ink to be used in combination with the black ink is particularly preferably a poor medium for the carbon black in the black ink because the bleeding can be suppressed especially effectively.

The components which compose an aqueous medium in the black ink used in combination with the ink of the present invention are not particularly limited as long as they meet the above-described preferable conditions, and it is possible to use the same components as those described for the aqueous medium of the ink of the present invention.

[Additives]

In the black ink, in addition to the above component, various additives such as a surfactant, a pH adjustor, a chelating agent, a rust inhibitor, an antiseptic, a mildew proofing agent, a UV absorber, a viscosity modifier, a defoaming agent, and a water-soluble polymer may be incorporated. The same type of additives as those described above may be used as such the additives.

<Ink Jet Recording Method>

The ink according to the present invention is used for an ink jet recording method in which the ink is ejected in accordance with a recording signal to record on a recording medium, to thereby obtain a suitable result. In this case, a preferable ink jet recording method involving applying thermal energy to ink on the recording medium to record thereon.

<Ink Cartridge>

An example of an ink cartridge suitable for performing recording by means of the ink according to the present invention includes an ink cartridge including an ink storage portion for storing the ink. Hereinafter, specific examples of the ink cartridge suitable for recording by means of the ink according to the present invention will be described.

FIG. 1 is a schematic cross-sectional view of an ink cartridge which can be used suitably to perform recording by using the ink of the present invention. As shown in FIG. 1, the ink cartridge communicates with the air through an air communication port 112 in its upper portion, and communicates with an ink supply port in its lower portion. The inside of the ink cartridge is divided into a negative pressure generation member storing chamber 134 which stores a negative pressure generation member, and a liquid storage chamber 136 which stores a liquid ink and is substantially sealed, with a partition wall 138 therebetween. The negative pressure generation member housing chamber 134 and the liquid storage chamber 136 communicate only through a communication hole 140 and an atmospheric air introducing groove (air introducing passage) 150, for accelerating introduction of the air to the liquid storage chamber during liquid supply operation, formed in the partition wall 138 near the bottom of the ink cartridge. On an upper wall of the ink cartridge which constitutes the negative pressure generation member housing chamber 134, a plurality of ribs are formed integrally therewith so as to protrude inside and abut against a negative pressure generation member stored in a compressed state in the negative pressure generation member housing chamber 134. The ribs form an air buffer chamber between the upper wall and the upper surface of the negative pressure generation member. Moreover, in an ink supply cylinder equipped with a liquid supply port 114, a pressure-contacting member 146, whose capillary force is higher than that of the negative pressure generation member and which has a large physical strength, is provided in pressure-contact with the negative pressure generation member.

In the example shown in the figure, in the negative pressure generation member housing chamber 134, there are stored, as negative pressure generation members, two capillary force generation type, negative pressure generation members, including a first negative pressure generation member 132B and a second negative pressure generation member 132A which are composed of fibers of an olefin resin such as polyethylene. Reference character 132C denotes a boundary of these two negative pressure generation members, and a crossing portion of the boundary 132C with the partition wall 138 exists above the upper end of the atmospheric air introducing groove (atmospheric air introducing passage) 150 in the orientation of the ink cartridge when used with the above-mentioned communicating portion being located downward. Moreover, ink contained inside the negative pressure generation member exists up to a position above the boundary 132C, as indicated by a liquid level L of the ink.

Here, at the boundary between the first negative pressure generation member and the second negative pressure generation member, the both layers are pressure-contacted with each other, and there is established a state such that the compressibility is higher and the capillary force is larger in the vicinity of the boundary of the both negative pressure generation members than the other portions. That is, when the capillary force of the first negative pressure generation member is represented by P1, the capillary force of the second negative pressure generation member is represented by P2, and the capillary force of the interface between the both negative pressure generation members is represented by PS, the relationship of P2<P1<PS holds.

Figure 2:
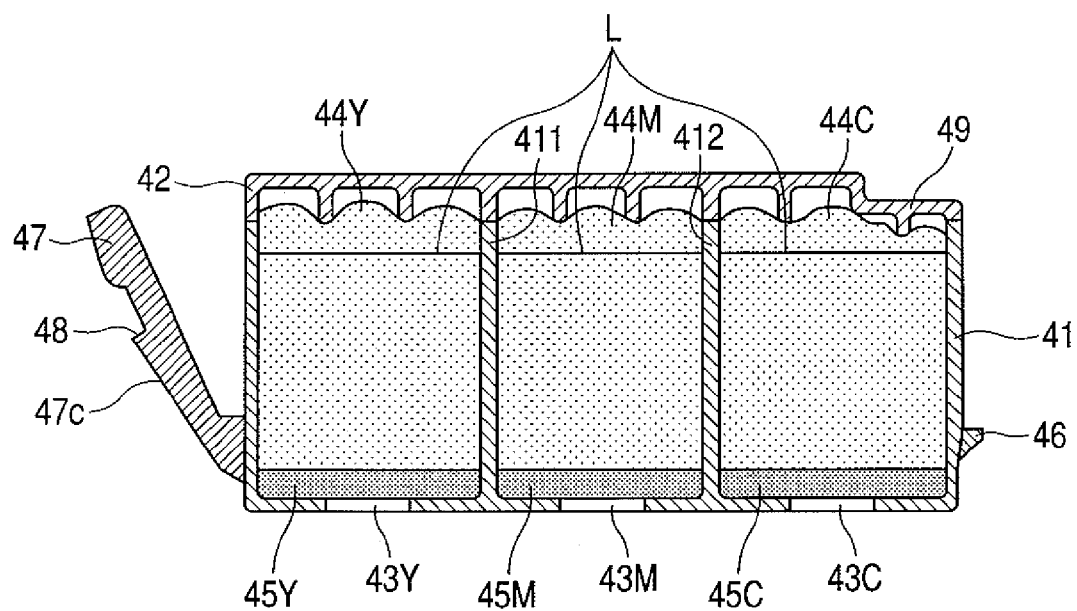
FIG. 2 is a schematic cross-sectional view showing another ink cartridge which is suitable to perform recording by using an ink in according to the present invention.

FIG. 2 is a schematic cross-sectional view of another ink cartridge which is suitable to perform recording by using the ink of the present invention. As shown in FIG. 2, the ink cartridge has a container 41 which contains three colors of inks, that is, yellow (Y), magenta (M) and cyan (C) respectively, and a lid member 42 which covers the container 41.

The inside of the container 41 is divided into three spaces, whose volumes are almost equal, with two partition plates 411 and 412 arranged parallel to each other, so as to contain three colors of inks. These three spaces are arranged in a direction of insertion of the color ink cartridge when mounting the color ink cartridge on an ink cartridge holder. Moreover, an ink absorber 44Y which absorbs and holds an yellow ink, an ink absorber 44M which absorbs and holds a magenta ink, and an ink absorber 44C which absorbs and holds a cyan ink are stored in these spaces, respectively. Moreover, the inks contained in the ink absorber 44Y, ink absorber 44M, and ink absorber 44C which are negative pressure generation members each exist up to a position above the corresponding ink absorber as represented by the liquid level L of the ink. Incidentally, in FIG. 2, reference characters 43Y, 43M, and 43C denote ink supply ports; reference characters 45Y, 45M, and 45C denote ink supply members; reference numeral 46 denotes an anti-demounting claw; reference numeral 47 denotes a latch lever; reference numeral 47c denotes a bottom bevel; reference numeral 48 denotes a latch claw; and reference numeral 49 denotes a step portion.

EXAMPLES

Hereinafter, the present invention will be described more specifically by way of examples and comparative examples. The present invention is not limited to the following examples without departing from the gist of the present invention. The terms "part" and "%" in the following description are on a mass basis unless otherwise stated.

<Evaluation of Ink>

Here, the evaluation of ink as an embodiment of the present invention was performed.

[Evaluation of bronzing phenomenon, uneven Glossiness, and Storage Stability]

(Preparation of Cyan Pigment Dispersion Solution)

10 parts of pigment (C. I. Pigment Blue 15:3), 20 parts of a dispersant, and 70 parts of ion-exchanged water were mixed and dispersed by a batch-type vertical sand mill for 3 hours. After that, the resultant dispersion solution was centrifuged to remove coarse particles. Further, the remainder was filtered through a microfilter having a pore size of 3.0 μm (manufactured by Fuji Photo Film Co., Ltd.) under pressure to prepare a cyan pigment dispersion. After that, water was added to attain a pigment concentration of 10 mass %, thereby preparing a cyan pigment dispersion solution. An aqueous solution prepared by neutralizing a styrene-acrylic acid copolymer having an acid value of 200 and a weight average molecular weight of 10,000 with a 10-mass % aqueous solution of sodium hydroxide was used as the dispersant.

(Determination of Poor Medium and Good Medium of Each Water-soluble Organic Solvent)

The following test was conducted in order to select a water-soluble organic solvent that acts as a poor medium or a good medium for the above obtained cyan pigment dispersion. Firstly, an aqueous solution with a solid content of 10 mass % of the cyan pigment dispersion solution which was obtained above was prepared. This pigment dispersion solution and respective water-soluble organic solvents were used to prepare a poor medium and a good medium-determination dispersion solution X and poor medium and a good medium-determination water dispersion solution Y according to the following compositions.

(Determination Dispersion Solution X)

| | |
|---|---|
| Cyan pigment dispersion solution | 50 parts |
| Water-soluble organic solvent shown in Table 1 | 50 parts |
| (Determination water dispersion solution Y) | |
| Cyan pigment dispersion solution | 50 parts |
| Pure water | 50 parts |

Next, 10 g of the respective determination dispersion solution X and determination water dispersion solution Y prepared as described above were placed in a transparent glass sample bottle with caps, respectively. After the bottles were covered with the cap, the dispersion solutions were sufficiently stirred and then allowed to stand still at 60° C. for 48 hours. After that, as measurement samples, the average particle sizes of the pigments in the settled dispersion solutions were measured using a fiber-optics particle analyzer (product name: FPAR-1000; Otsuka Electronics Co., Ltd.). When the average particle size of the pigments in the determination dispersion solution X was larger than the average particle size of the pigments in the determination water dispersion solution Y, the water-soluble organic solvent contained in the determination dispersion solution X at that time was determined as a poor medium; whereas when the average particle size of the pigments in the determination dispersion solution X was equal to or smaller than the average particle size of the pigments in the determination water dispersion solution Y, the water-soluble organic solvent contained in the determination dispersion solution X at that time was determined as a good medium.

Determination as to whether each of two kinds of water-soluble organic solvents shown in Table 1 corresponded to a poor medium or good medium for the pigment dispersion in the cyan pigment dispersion solution was performed by measuring an average particle size as described above. Table 1 shows the results of the evaluation. With regard to the results in Table 1, the case where a water-soluble organic solvent was determined as a good medium was denoted by ○, and the case where a water-soluble organic solvent was determined as a poor medium was denoted by x.

(Measurement of Ka Values of Water-soluble Organic Solvents)

First, to measure the Ka value of each water-soluble organic solvent, an aqueous dye solution with a dye concentration of 0.5 mass %, having composition shown below, was prepared. Such an aqueous dye solution is used in order to color a colorless transparent sample to make it visible so that the Ka value can be easily measured.

| C.I. Direct Blue 199 | 0.5 part |
|---|---|
| Pure water | 99.5 parts |

Next, using this aqueous 0.5 mass % dye solution and each water-soluble organic solvent to be measured, each of aqueous 20% solution of colored water-soluble organic solvents having the composition shown below was prepared.

| Above aqueous 0.5 mass % dye solution | 80 parts |
|---|---|
| A water-soluble organic solvent shown in Table 1 | 20 parts |

Using as a measuring sample the aqueous 20 mass % solution of each colored water-soluble organic solvent, prepared as described above, the Ka value of the aqueous 20 mass % solution of each water-soluble organic solvent was measured by the Bristow method using a dynamic permeability tester (trade name: Dynamic permeability tester S; manufactured by Toyo Seiki Seisaku-Sho, Ltd.). Table 1 shows the results of the measurement of the Ka value of each water-soluble organic solvent in a 20 mass % aqueous solution.

TABLE 1

| Water-soluble organic solvent | Results of determination with respect to cyan pigment dispersion solution | Ka value of 20-mass % aqueous solution $[ml/m^2/msec^{1/2}]$ |
|---|---|---|
| Glycerin | ○ | 0.13 |
| Polyethylene glycol 1000 | x | 0.18 |

(Preparation of Inks)

The respective components shown in each of Tables 2 and 3 below were mixed and sufficiently stirred. After that, the resultant was filtered through a microfilter having a pore size of 3.0 μm (manufactured by Fuji Photo Film Co., Ltd.) under pressure to prepare each aqueous ink of each of examples 1 to 11 and comparative examples 1 to 7 were prepared. The surface tension at 25° C. of each of the inks of examples 1 to 11 and comparative examples 1 to 7 obtained above was measured by using a Kyowa CBVP-2 type surface tension meter (Kyowa Kagaku Co., Ltd.). Tables 2 and 3 show the measured surface tensions of the inks. Each of Tables 2 and 3 show the content A (mass %) of a pigment, the content B (mass %) of a poor medium, the content C (mass %) of a good medium, the content D (mass %) of a dye in each ink, and values for B/A, C/B, and A/D×100 in ink.

TABLE 2

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| C.I. Direct Blue 199 | 3 | | | 3 | 3 | 3 | 3.5 | 3.7 | 3.7 | 3 | 3 |
| C.I. Direct Blue 86 | | 3 | | | | | | | | | |
| C.I. Acid Blue 9 | | | 3 | | | | | | | | |
| Cyan pigment dispersion solution | 2 | 2 | 2 | 5 | 7 | 9 | 9 | 9 | 9 | 7 | 5 |
| Polyethylene glycol 1000 | 2 | 2 | 2 | 2 | 2 | 2 | 2 | 0.8 | 3.6 | 2 | 2.5 |
| Glycerin | 4 | 4 | 4 | 4 | 4 | 4 | 4 | 5.2 | 4 | 4 | 4 |
| Surfinol 465 (*1) | 0.4 | 0.4 | 0.4 | 0.4 | 0.4 | 0.4 | 0.4 | 0.4 | 0.4 | 0.9 | 0.4 |
| Water | 88.6 | 88.6 | 88.6 | 85.6 | 83.6 | 81.6 | 81.1 | 80.9 | 79.3 | 83.1 | 85.1 |
| Surface tension [mN/m] | 40.2 | 40.5 | 40.4 | 38.4 | 38.4 | 39.4 | 39.2 | 39.3 | 38.1 | 34.0 | 38.2 |
| Content A of a pigment [mass %] | 0.2 | 0.2 | 0.2 | 0.5 | 0.7 | 0.9 | 0.9 | 0.9 | 0.9 | 0.7 | 0.5 |
| Content B of a poor medium [mass %] | 2 | 2 | 2 | 2 | 2 | 2 | 2 | 0.8 | 3.6 | 2 | 2.5 |
| Content C of a good medium [mass %] | 4 | 4 | 4 | 4 | 4 | 4 | 4 | 5.2 | 4 | 4 | 4 |
| Content D of a dye [mass %] | 3 | 3 | 3 | 3 | 3 | 3 | 3.5 | 3.7 | 3.7 | 3 | 3 |
| B/A[-] | 10 | 10 | 10 | 4 | 2.9 | 2.2 | 2.2 | 0.9 | 4 | 2.9 | 5 |
| C/B[-] | 2 | 2 | 2 | 2 | 2 | 2 | 2 | 6.5 | 1.1 | 2 | 1.6 |
| A/D × 100[%] | 6.7 | 6.7 | 6.7 | 16.7 | 23.3 | 30.0 | 25.7 | 24.3 | 24.3 | 23.3 | 16.7 |

(*1) A surfactant (manufactured by Nissin Chemical Industry Co., Ltd.)

TABLE 3

| | Comparative Example | | | | | | |
|---|---|---|---|---|---|---|---|
| | 1 | 2 | 3 | 4 | 5 | 6 | 7 |
| C.I. Direct Blue 199 | 3 | | | 3 | 3 | 3 | |
| C.I. Direct Blue 86 | | 3 | | | | | |

TABLE 3-continued

|  | Comparative Example | | | | | | |
|---|---|---|---|---|---|---|---|
|  | 1 | 2 | 3 | 4 | 5 | 6 | 7 |
| C.I. Acid Blue 9 |  |  | 3 |  |  |  |  |
| Cyan pigment dispersion solution | 2 | 2 | 2 | 9 | 11 |  | 11 |
| Polyethylene glycol 1000 |  |  |  |  | 2 | 2 |  |
| Glycerin | 6 | 6 | 6 | 6 | 4 | 4 | 4 |
| Surfinol 465 (*1) | 0.4 | 0.4 | 0.4 | 0.4 | 0.4 | 0.4 | 0.4 |
| Water | 88.6 | 88.6 | 88.6 | 81.6 | 79.6 | 90.6 | 84.6 |
| Surface tension [mN/m] | 40.4 | 40.6 | 40.5 | 39.1 | 38.1 | 32.2 | 38.3 |
| Content A of a pigment [mass %] | 0.2 | 0.2 | 0.2 | 0.9 | 1.1 | 0 | 1.1 |
| Content B of a poor medium [mass %] | 0 | 0 | 0 | 0 | 2 | 2 | 0 |
| Content C of a good medium [mass %] | 6 | 6 | 6 | 6 | 4 | 4 | 4 |
| Content D of a dye [mass %] | 3 | 3 | 3 | 3 | 3 | 3 | 0 |
| B/A[-] | 0 | 0 | 0 | 0 | 1.8 | — | 0 |
| C/B[-] | — | — | — | — | 2 | 2 | — |
| A/D × 100[%] | 6.7 | 6.7 | 6.7 | 30.0 | 36.7 | 0 | — |

(*1) A surfactant (manufactured by Nissin Chemical Industry Co., Ltd.)

(Production of Recorded Matter)

A recorded matter was produced by using an ink jet recording apparatus (trade name: PIXUS 950i; manufactured by Canon Inc.), which ejects an ink by an action of thermal energy. To be specific, an ink cartridge having the constitution of FIG. 1 was filled with each of the inks obtained above, the ink cartridge was mounted on the ink jet recording apparatus, and an image was formed. Then, a recorded matter in which a 10 cm×10 cm solid image was formed on Professional Photo Paper PR-101 (manufactured by Canon Inc.) was made using each of the inks of examples 1 to 11 and comparative examples 1 to 5 and 7.

A Pro Photo Paper mode was selected for a printer driver. Setting conditions for the Pro Photo Paper mode are as follows.

Type of paper: Pro Photo Paper
Print quality: high
Color adjustment: automatic (Bronzing Phenomenon)

Each of the recorded matter obtained above was place on a desk which was irradiated with a cool white fluorescent lamp (or daylight fluorescent lamp), and the recorded matter was visually observed at various angles by changing a line of sight to the recorded matter, whereby occurrence of a bronzing phenomenon was checked to perform evaluation. The evaluation criteria for the bronzing phenomenon are as described below. Table 4 shows the results of the evaluation.

A: When the observation angle was changed, there was no change in the color of light reflected by the recorded matter.

B: Although a change in the color of reflected light by the recorded matter was confirmed by changing the observation angle, the level of the change was not conspicuous in comparison with the level of a change of a color of reflected light by the recorded matter of a comparative example.

C: It was confirmed that a change of a color of reflected light by the recorded matter was in the same level as a change of a color of reflected light on the recorded matter of a comparative example by changing the observation angle.

TABLE 4

|  |  | Bronzing phenomenon |
|---|---|---|
| Example | 1 | A |
|  | 2 | A |
|  | 3 | A |
|  | 4 | A |

TABLE 4-continued

|  | Bronzing phenomenon |
|---|---|
| 5 | A |
| 6 | B |
| 7 | B |
| 8 | B |
| 9 | A |
| 10 | A |
| 11 | A |

It can be seen from Table 4 that the recorded matter produced by using the inks of Examples 6 to 8 were evaluated for the bronzing phenomenon as B. However, Example 8 exhibited the effect which was inferior to the effects of Examples 6 and 7.

(Uneven Glossiness)

Each of the recorded matter obtained above was visually observed to check occurrence of uneven glossiness, thereby performing evaluation. As a result, occurrence of uneven glossiness was confirmed in examples 6 and 7 with higher contents of the pigment and dye in the ink in comparison with the recorded matter which were made with the other inks.

(Storage Stability)

Each of the inks of Examples 1 to 11 prepared above was charged into a shot bottle, and the bottle was tightly stopped. Then, the bottle was stored in an oven at 60° C. for 2 weeks. The average particle sizes of a pigment and the viscosities of the ink before and after the storage at 60° C. were measured, and a rate of change in average particle size and a rate of change in viscosity were determined. Then, evaluation was performed on the basis of the respective resultant rates of change. The evaluation criteria for storage stability are as described below. Table 5 shows the results of the evaluation.

A: A rate of change in average particle size of a pigment or a rate of change in viscosity of ink before and after storage at 60° C. is 5% or less.

B: A rate of change in average particle size of a pigment or a rate of change in viscosity of ink before and after storage at 60° C. is more than 5% and 10% or less.

C: After storage at 60° C., ink changes into a gel, the upper portion of the ink becomes transparent, or the ink clearly thickens.

TABLE 5

| | | Storage stability |
|---|---|---|
| Example | 1 | B |
| | 2 | B |
| | 3 | B |
| | 4 | A |
| | 5 | A |
| | 6 | A |
| | 7 | A |
| | 8 | A |
| | 9 | A |
| | 10 | A |
| | 11 | B |

[Evaluation of Color Developability, Bleeding of Image Formed on Plain Paper]

The following evaluation was performed by using the inks of examples 1 to 11 and comparative examples 1 to 4, 6 and 7 prepared above, and further black inks described below.

(Preparation of Black Pigment Dispersion Solution 1)

10 parts of carbon black having a specific surface area of 210 m²/g and a DBP oil absorption of 74 ml/100 g, 20 parts of a dispersant, and 70 parts of ion-exchanged water were mixed and dispersed by a sand grinder for 1 hour. After that, the resultant dispersion solution was centrifuged to remove coarse particles. Further, the remainder was filtered through a microfilter having a pore size of 3.0 μm (manufactured by Fuji Photo Film Co., Ltd.) under pressure to prepare a black pigment dispersion 1. After that, water was added to attain a pigment concentration of 10 mass %, thereby preparing a black pigment dispersion solution 1. An aqueous solution prepared by neutralizing a styrene-acrylic acid copolymer having an acid value of 200 and a weight average molecular weight of 10,000 with a 10-mass % aqueous solution of sodium hydroxide was used as the dispersant.

(Preparation of Black Pigment Dispersion Solution 2)

1.5 g of 4-aminophthalic acid was added in a cooled state of 5° C. to a solution of 5 g of concentrated hydrochloric acid dissolved in 5.5 g of water. This solution was stirred in an ice bath to be always maintained at 10° C. or less and a solution of 1.8 g of sodium nitrite dissolved in 9 g of 5° C. water was added to this solution. After the resulting solution was further stirred for 15 minutes, 6 g of carbon black having a specific surface area of 220 m²/g and a DBP oil absorption of 105 mL/100 g was added and mixed. Thereafter, this solution was stirred for another 15 minutes. The obtained slurry was filtered with a paper filter (trade name: Standard filter paper No. 2; manufactured by ADVANTEC), and pigment particles were thoroughly washed with water and dried in an oven heated at 110° C. to prepare self-dispersion carbon black was prepared. After that, water was added to the obtained self-dispersion carbon black to prepare a black pigment dispersion solution 2 having a pigment concentration of 10 mass %.

(Determination of Poor Medium and Good Medium of Each Water-soluble Organic Solvents)

The following test was conducted in order to select a water-soluble organic solvent that acts as a poor medium or a good medium for the above obtained black pigment dispersion solutions 1 and 2 by means of a method similar to a method for determination as to select each water-soluble organic solvent was a poor medium or a good medium for the cyan pigment dispersion solution. Determination as to whether each of two kinds of water-soluble organic solvents shown in Table 6 corresponded to a poor medium or good medium for a pigment dispersion in each black pigment dispersion solution was performed. Table 6 shows the results of the evaluation.

With regard to the results in Table 6, the case where a water-soluble organic solvent was determined as a good medium was denoted by ○, and the case where a water-soluble organic solvent was determined as a poor medium was denoted by x.

TABLE 6

| Water-soluble organic solvent | Black pigment dispersion solution 1 | Black pigment dispersion solution 2 |
|---|---|---|
| Glycerin | ○ | ○ |
| Polyethylene glycol 1000 | x | x |

(Preparation of Ink)

The respective components shown in Table 7 below were mixed and sufficiently stirred. After that, the resultant was filtered through a microfilter having a pore size of 3.0 μm (manufactured by Fuji Photo Film Co., Ltd.) under pressure to prepare each of the black inks 1 and 2.

TABLE 7

| | Black ink | |
|---|---|---|
| | 1 | 2 |
| Black pigment dispersion solution 1 | 40.0 | |
| Black pigment dispersion solution 2 | | 40.0 |
| Glycerin | 7.5 | 7.5 |
| Polyethylene glycol 1000 | 4.0 | 4.0 |
| Surfinol 465 (*1) | 0.2 | 0.2 |
| Water | 48.3 | 48.3 |

(*1) A surfactant (manufactured by Nissin Chemical Industry Co., Ltd.)

(Production of Recorded Matter)

A recorded matter was produced by using an ink jet recording apparatus (trade name: PIXUS 950i; manufactured by Canon Inc.), which ejects an ink by an action of thermal energy. To be specific, an ink cartridge having the constitution of FIG. 1 was filled with each of the inks obtained above, the ink cartridge was mounted on the ink jet recording apparatus, and an image was formed. Then, a recorded matter on which a solid image measuring 2 cm×2 cm in a state where a cyan ink and a black ink were adjacent to each other was formed was produced on each of the following four kinds of copy paper (plain paper) by using each of the inks of examples 1 to 11 and comparative examples 1 to 4, 6 and 7, and the black ink 1.

A default mode was selected for a printer driver. Setting conditions for the default mode are as follows.

Type of paper: plain paper
Print quality: standard
Color adjustment: automatic

The following four kinds of copy papers (plain paper) were used as recording media.

PPC paper PB (manufactured by CANON Inc.)
PPC paper 4024 (manufactured by Xerox Co., Ltd.)
PPC paper Proberbond (manufactured by Fox River)
PPC paper for Canon (manufactured by Neusiedler)

(Color Developability and Bleeding)

Immediately after the production of the recorded matter, the degree of bleeding in a portion where an image formed with the black ink 1 and an image formed with any one of the inks of the examples were adjacent to each other was visually observed. In addition, similarly, the degree of bleeding in a portion where an image formed with the black ink 1 and an image formed with the ink with any one of the inks of the comparative example were adjacent to each other was visually observed in the same manner, and a recorded matter of each of the examples and a recorded matter of each of the comparative examples were compared with each other for evaluation. Furthermore, one day after producing the recorded matter, the optical density in a cyan image was measured using Macbeth RD915 (manufactured by GRETAG MACBETH AG.). The evaluation criteria for color developability and bleeding are as described below. Table 8 shows the results of the evaluation. The results of the evaluation in Table 8 were common to all recording media used.

A: An image is clearly superior to an image formed with the ink of each of the comparative examples in both color developability and suppression of bleeding.

B: An image is superior to an image formed with the ink of each of the comparative examples in one of color developability and suppression of bleeding.

C: An image does not differ from an image formed with the ink of each of the comparative examples in color developability and suppression of bleeding.

TABLE 8

|         |    | Color developability and bleeding |
|---------|----|-----------------------------------|
| Example | 1  | B                                 |
|         | 2  | B                                 |
|         | 3  | B                                 |
|         | 4  | A                                 |
|         | 5  | A                                 |
|         | 6  | A                                 |
|         | 7  | A                                 |
|         | 8  | B                                 |
|         | 9  | A                                 |
|         | 10 | B                                 |
|         | 11 | A                                 |

It can be seen from Table 8 that all of examples 1 to 11 provide at least one effect of the excellent color developability and the excellent suppression of bleeding in comparison with comparative examples 1 to 4 each not containing a poor medium for the pigment, comparative example 6 wherein the coloring material was only the dye, and comparative example 7 wherein the coloring material was only the pigment. Incidentally, example 6 exhibits the effect more excellent in both the color developability and the suppression of bleeding than examples 4 and 5. Moreover, examples 7 to 9, because of having larger contents of dyes in the inks than those of comparative examples, exhibit the superior color developability. However, example 8, because of having a smaller ratio of the content B of the poor medium to the content A of the pigment than the ratios of examples 7 and 9, exhibits the color developability and the suppression of bleeding inferior to the effects of examples 7 and 9.

By using the black ink 2 instead of the black ink 1, and by following the same procedure as described above, a recorded matter was produced in which a 2 cm×2 cm solid image was formed with the cyan ink of example 1 and the black ink 2 being deposited adjacent to each other. Immediately after production of the recorded matter, the degree of bleeding at a portion where an image formed with the black ink 2 and an image formed with any one of the ink of example were adjacent to each other was visually observed and compared with that of the recorded matter formed with the cyan ink of example 1 and the black ink 1. As a result, the recorded matter made using the black ink 2 was of the B rank in terms of the above-mentioned criteria for evaluation. However, it exhibits the effect of suppressing the bleeding which is somewhat superior to that of the recorded matter made by using the black ink 1.

<Evaluation of Method of Producing Ink Jet Ink>

Here, the evaluation of ink obtained by means of the method of producing ink jet ink as another embodiment of the present invention was performed.

The respective components shown in Table 9 below were mixed and sufficiently stirred. After that, the resultant was filtered through a microfilter having a pore size of 3.0 μm (manufactured by Fuji Photo Film Co., Ltd.) under pressure to prepare an ink A. The ink A contains the copper phthalocyanine pigment and a poor medium for the copper phthalocyanine pigment.

TABLE 9

|                          | Composition |
|--------------------------|-------------|
| C.I. Direct Blue 199     | 2.4         |
| Cyan pigment dispersion solution | 9.0 |
| Glycerin                 | 5.0         |
| Polyethylene glycol 1000 | 14.0        |
| Surfynol 465 (*1)        | 0.4         |
| Water                    | 69.2        |

(*1) A surfactant (manufactured by Nissin Chemical Industry Co., Ltd.)

Ink tanks having the structure illustrated in FIG. 1 were filled with 14.5 g of the ink A prepared according to the formulation shown in Table 9. Then, 12.5 g of the ink was discharged from the ink cartridge. After that, the ink cartridge was filled with 10.0 g of respective inks prepared in comparative examples 1 to 3 whereby each of inks of examples 12 to 14 was prepared. Those inks were extracted from the ink cartridge, and were analyzed for composition. As a result, each of them was found to have the composition shown in Table 10 below. Moreover, the surface tension at 25° C. of each of the inks of examples 12 to 14 prepared above was measured by using a Kyowa CBVP-2 type surface tension meter (Kyowa Kagaku Co., Ltd.). The measured surface tensions of the ink are shown in Table 10.

TABLE 10

|                                      | Example |      |      |
|--------------------------------------|---------|------|------|
|                                      | 12      | 13   | 14   |
| C.I. Direct Blue 199                 | 3.4     | 0.4  | 0.4  |
| C.I. Direct Blue 86                  |         | 3    |      |
| C.I. Acid Blue 9                     |         |      | 3    |
| C.I. Pigment Blue 153                | 0.3     | 0.3  | 0.3  |
| Styrene-acrylic acid copolymer (*2)  | 0.6     | 0.6  | 0.6  |
| Glycerin                             | 13.3    | 13.3 | 13.3 |
| Polyethylene glycol 1000             | 2.3     | 2.3  | 2.3  |
| Acetylene glycol-ethylene oxide adduct | 0.4   | 0.4  | 0.4  |
| Water                                | 79.7    | 79.7 | 79.7 |
| Surface tension [mN/m]               | 40.7    | 40.5 | 40.3 |

(*2) Acid value of 200 and weight average molecular weight of 10,000

(Production of Recorded Matter)

A recorded matter was produced by using each of the inks of examples 12 to 14. An ink jet recording apparatus (trade name: PIXUS 950i; manufactured by Canon Inc.), which ejects an ink by an action of thermal energy was used for producing the recorded matter. To be specific, the ink cartridge obtained above was mounted on the ink jet recording apparatus, and an image was formed. More specifically, a recorded matter in which a 10 cm×10 cm solid image was formed on Professional Photo Paper PR-101 (manufactured by Canon Inc.) was made using each of the inks of examples 12 to 14. In a printer driver, a Pro Photo Paper mode was selected.

A Pro Photo Paper mode was selected for a printer driver. Setting conditions for the Pro Photo Paper mode are as follows.

Type of paper: Pro Photo Paper
Print quality: high
Color adjustment: automatic
(Bronzing Phenomenon)

Each of the recorded matter obtained above was place on a desk which was irradiated with a cool white fluorescent lamp (or daylight fluorescent lamp), and the recorded matter was visually observed at various angles by changing a line of sight to the recorded matter, whereby occurrence of a bronzing phenomenon was checked to perform evaluation. Criteria of the evaluation of the bronzing phenomenon are as follows. The evaluation results are shown in Table 11. Incidentally, the comparative examples referred to in the following criteria of evaluation are comparative examples 1 to 5 and 7 similarly as above.

A: When the observation angle was changed, there was no change in the color of light reflected by the recorded matter.

B: Although a change in the color of reflected light by the recorded matter was confirmed by changing the observation angle, the level of the change was not conspicuous in comparison with the level of a change of a color of reflected light by the recorded matter of a comparative example.

C: It was confirmed that a change of a color of reflected light by the recorded matter was in the same level as a change of a color of reflected light on the recorded matter of a comparative example by changing the observation angle.

TABLE 11

|         |    | Bronzing phenomenon |
|---------|----|---------------------|
| Example | 12 | A                   |
|         | 13 | A                   |
|         | 14 | A                   |

The present invention can be utilized, for example, in a method of producing an ink jet ink that can effectively use an ink cartridge which has stored an ink jet ink containing a pigment having a copper phthalocyanine skeleton as a coloring material and a poor medium to the pigment. According to the production method, it is possible to reuse an ink cartridge which has contained a useful ink as such, and hence, it is possible to reduce the production cost. Furthermore, with such a method, since an ink cartridge which stored an ink once, or an ink cartridge which has an ink containing portion for housing the ink is used, it is easy to fill the ink, and also in this respect, it is possible to improve the production efficiency.

This application claims priority from Japanese Patent Application No. 2005-171072 filed Jun. 10, 2005, which is hereby incorporated by reference herein.

The invention claimed is:

1. A method of producing an ink jet ink, the ink jet ink comprising water, coloring materials, and a water-soluble organic solvent, wherein the coloring materials comprise at least one dye selected from the group consisting of C.I. Direct Blue 199, C.I. Direct Blue 86, and C.I. Acid Blue 9, and a pigment having a copper phthalocyanine skeleton, wherein the water-soluble organic solvent comprises a poor medium for the pigment having the copper phthalocyanine skeleton, and wherein a content of the pigment having the copper phthalocyanine skeleton in the ink is less than 1 mass % with respect to a total mass of the ink jet ink, said method comprising the step of injecting an ink comprising at least one dye selected from the group consisting of C.I. Direct Blue 199, C.I. Direct Blue 86, and C.I. Acid Blue 9 as a coloring material into an ink cartridge storing an ink which comprises a pigment having a copper phthalocyanine skeleton and a poor medium for the pigment.

2. The ink jet ink produced by the method according to claim 1.

3. An ink jet recording method comprising ejecting the ink jet ink according to claim 2 by an ink jet method.

4. An ink cartridge comprising an ink storage portion for storing an ink, wherein the ink storage portion stores the ink jet ink according to claim 2.

* * * * *